United States Patent
Di et al.

(10) Patent No.: US 9,930,239 B2
(45) Date of Patent: Mar. 27, 2018

(54) MULTI-TURN COIL MULTIPLEX CIRCUIT AND METHOD AND DEVICE FOR CONTROLLING MULTI-TURN COIL MULTIPLEX CIRCUIT

(71) Applicant: Xiaomi Inc., Beijing (CN)

(72) Inventors: Hao Di, Beijing (CN); Xinming Shi, Beijing (CN); Wei Sun, Beijing (CN)

(73) Assignee: Xiaomi Inc., Beijing (CN)

( * ) Notice: Subject to any disclaimer, the term of this patent is extended or adjusted under 35 U.S.C. 154(b) by 18 days.

(21) Appl. No.: 14/949,547

(22) Filed: Nov. 23, 2015

(65) Prior Publication Data
US 2016/0212321 A1      Jul. 21, 2016

Related U.S. Application Data

(63) Continuation-in-part of application No. PCT/CN2014/076105, filed on Apr. 24, 2014.

(30) Foreign Application Priority Data

Jun. 9, 2013   (CN) .......................... 2013 1 0231968

(51) Int. Cl.
*H04N 5/232* (2006.01)
*H04B 5/00* (2006.01)
*H04N 5/225* (2006.01)

(52) U.S. Cl.
CPC ....... *H04N 5/23206* (2013.01); *H04B 5/0031* (2013.01); *H04B 5/0081* (2013.01);
(Continued)

(58) Field of Classification Search
CPC ........... H04N 5/23206; H04N 5/23203; H04N 5/23212; H04N 5/2251; H04B 5/0081; H04B 5/0031
See application file for complete search history.

(56) References Cited

U.S. PATENT DOCUMENTS 6,614,802 B1 *  9/2003  Garland .............. H04M 11/007
                                                          370/353
2002/0142800 A1  10/2002  Iimura et al.
(Continued)

FOREIGN PATENT DOCUMENTS

CN      1378404 A      11/2002
CN      1457445 A      11/2003
(Continued)

OTHER PUBLICATIONS

Office Action (including English translation) issued in corresponding CN Application No. 2013102319680, dated Oct. 12, 2015, 9 pages.
(Continued)

*Primary Examiner* — Christopher K Peterson

(57) ABSTRACT

Examples herein provide multi-turn coil multiplex circuits. The multi-turn coil multiplex circuits include a multi-turn coil, a switch, a near field communication (NFC) matching circuit, and a camera circuit. The switch includes a common port, a first port, and a second port. The multi-turn coil is connected to the common port. The NFC matching circuit is connected to the first port. The camera circuit is connected to the second port. Where a camera control signal is present, the connection with the second port is activated and the multi-turn coil can be used as a camera focusing coil associated with the camera circuit. Where no camera control signal is present, the connection with the first port is activated and the multi-turn coil can be used as an NFC antenna associated with the NFC matching circuit.

20 Claims, 2 Drawing Sheets

(52) U.S. Cl.
CPC ....... *H04N 5/2251* (2013.01); *H04N 5/23212* (2013.01); *H04N 5/23203* (2013.01)

(56) References Cited

U.S. PATENT DOCUMENTS

| | | |
|---|---|---|
| 2003/0090579 A1 | 5/2003 | Ohe et al. |
| 2007/0250707 A1 | 10/2007 | Noguchi |
| 2008/0245851 A1 | 10/2008 | Kowalski |
| 2009/0001930 A1* | 1/2009 | Pohjonen ............. H01Q 1/2225 320/108 |
| 2009/0186653 A1* | 7/2009 | Drader .............. H04M 1/72591 455/556.1 |
| 2013/0043835 A1 | 2/2013 | Yoon |
| 2014/0206419 A1 | 7/2014 | Wang et al. |
| 2015/0155740 A1 | 6/2015 | Joon |

FOREIGN PATENT DOCUMENTS

| | | |
|---|---|---|
| CN | 101416412 A | 4/2009 |
| CN | 202308282 U | 7/2012 |
| CN | 202615108 U | 12/2012 |
| CN | 202615109 U | 12/2012 |
| CN | 103347147 A | 10/2013 |
| EP | 2573866 A1 | 3/2013 |
| JP | 2007050256 A | 3/2007 |
| JP | 2010213195 A | 9/2010 |
| JP | 3165855 U | 2/2011 |
| JP | 2012137822 A | 7/2012 |
| KR | 10-1990-0002492 | 2/1990 |
| KR | 10-2008-0013535 | 2/2008 |
| KR | 10-0911032 | 7/2009 |
| RU | 2414054 C2 | 3/2011 |
| WO | 2005050384 A2 | 6/2005 |
| WO | 2007104365 A1 | 9/2007 |
| WO | 2010052770 A1 | 5/2010 |
| WO | 2012151911 A1 | 11/2012 |
| WO | 2013057367 A1 | 4/2013 |

OTHER PUBLICATIONS

Extended European Search report issued in corresponding EP Application 14 81 1465, dated Mar. 16, 2017, 6 pages.
Copy of Office Action (including English translation) issued in corresponding JP Application No. 2015-543304, dated Jul. 25, 2016, 9 pages.
Office Action (including English translation) issued in corresponding KR Application No. 10-2015-7013607, dated Feb. 29, 2016, 7 pages.
Notice of Allowance (including English translation) issued in corresponding KR Application No. 10-2015-7013607, dated Jul. 29, 2016, 3 pages.
International Search Report issued in corresponding International Application No. PCT/CN2014/076105, dated Aug. 5, 2014, 2 pages.
Office Action (including English translation) issued in corresponding RU Application No. 2015120735/07 (032127), dated Feb. 15, 2016, 13 pages.
Decision to Grant (including English translation) issued in corresponding RU Application No. 2015120735/07 (032127), dated Oct. 6, 2016, 15 pages.

* cited by examiner

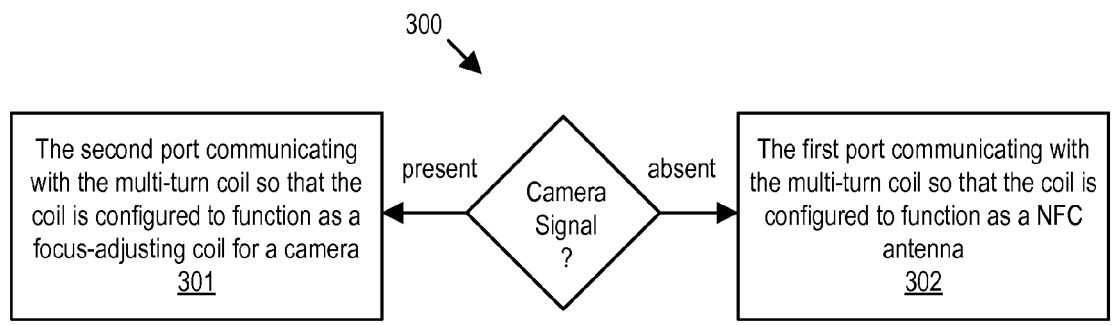
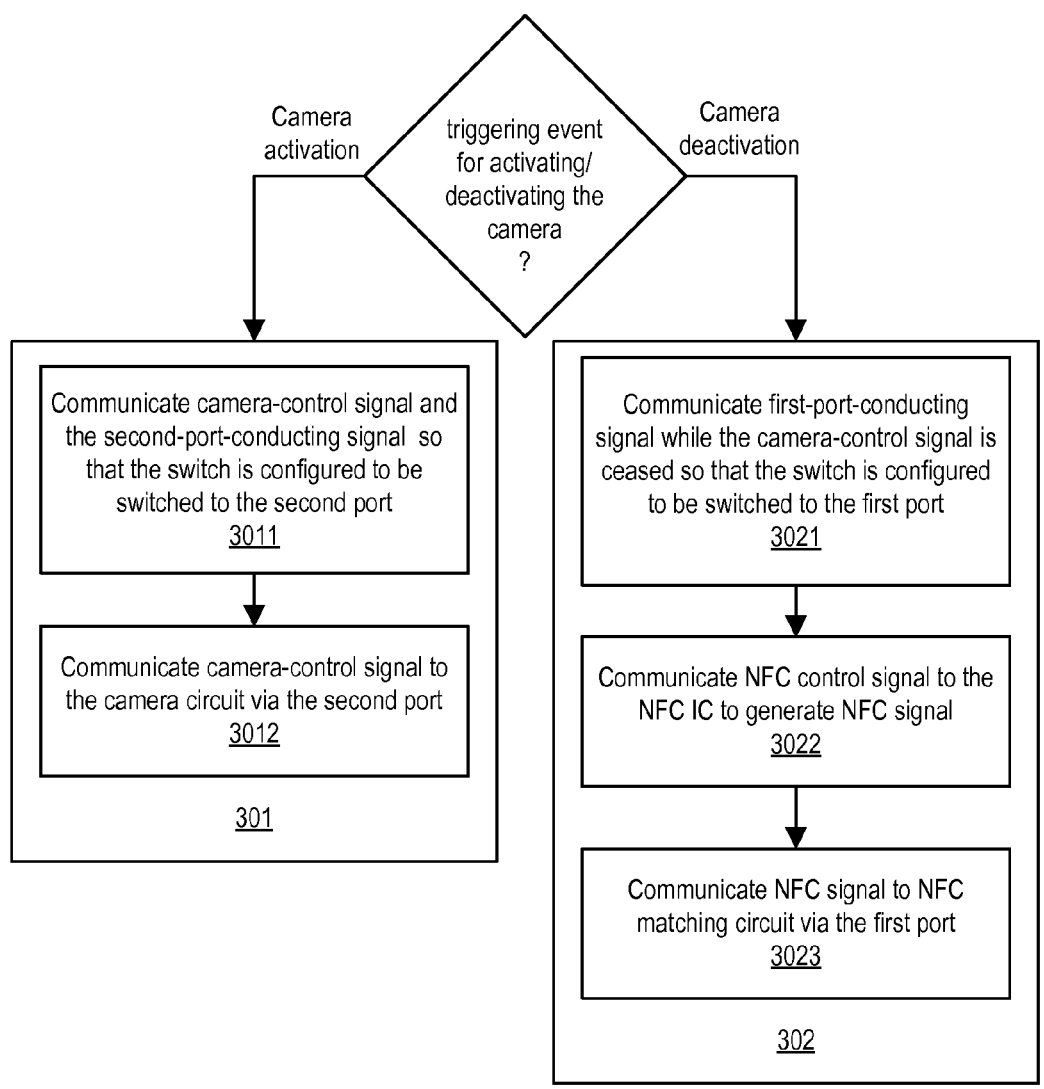

MULTI-TURN COIL MULTIPLEX CIRCUIT AND METHOD AND DEVICE FOR
CONTROLLING MULTI-TURN COIL
MULTIPLEX CIRCUIT

CROSS-REFERENCE TO RELATED APPLICATIONS

The present application is a continuation-in-part of International Application No. PCT/CN2014/076105, filed Apr. 24, 2014 which is based upon and claims priority to Chinese Patent Application No. 201310231968.0, filed Jun. 9, 2013, the entire contents of which are incorporated herein by reference.

TECHNICAL FIELD

The present disclosure generally relates to the technical field of electronic devices, and more particularly, to a multi-turn-coil multiplex circuit, a method for controlling the circuit, an electronic device including the circuit.

BACKGROUND

Near field communication (NFC) is a type of non-contact identification and communication technology, which may be used for short distance wireless communication between devices, such as mobile devices, consumer electronics, personal computers, and intelligent controller tools. NFC provides a simple and touch-controlled solution for information exchange, to allow users to exchange information, access data, and use online services.

NFC is a kind of wireless communication technology, which uses an antenna to support relevant communication functions. Since an NFC operating frequency is 13.56 MHz, NFC operates with an electromagnetic wavelength of about 22 meters, and NFC operates within a short distance (e.g., 3-5 mm) for reading and writing information, the NFC antennae is typically made of a coil antenna. Also, because users of electronic devices are sometimes concerned with the external appearance of the devices, the NFC antenna is typically within the device. For example, an NFC antenna in a mobile phone can be attached to a battery cover or a battery, and connected to an NFC radio frequency (RE) link via an NFC antenna contact points. Also, an NFC antenna may produce an eddy current on a metal surface when it is proximate to metal, and a magnetic field associated with the eddy current may weaken the magnetic field of the NFC antenna. This can affect the performance of the antenna. To improve performance, a layer of magnetic material can be attached below the NFC antenna, such that the magnetic field associated with the NFC antenna on the battery side may be gathered at an area of the magnetic material and not reach surfaces of components in the electronic device, such as a battery of the device (which contain metal). Yet, this technique may reduce the eddy current to be produced on a neighboring metal surface, which can weaken the magnetic field produced by the coil itself.

Also with electronic devices (especially mobile devices), space for components is becoming smaller and the amount of functions provided by the devices are becoming greater. For example, many mobile phones currently also include digital cameras besides providing NFC. Thus, there are a set of technical problems yet to be solved regarding such devices.

SUMMARY

Example embodiments described herein may include a multi-turn-coil multiplex circuit or a method for controlling a multi-turn-coil multiplex circuit. A corresponding NFC antenna may be disposed on a motherboard, such as a motherboard of a mobile device. The multi-turn-coil multiplex circuit may include a multi-turn coil, a switch, a near field communication (NFC) matching circuit and a camera circuit. The switch may include a common port, a first port, and a second port. The multi-turn coil can be connected to the common port. The NFC matching circuit can be connected to the first port. The camera circuit can be connected to the second port. With a camera-control signal received via the second port, the multi-turn coil functions as a focus-adjusting coil for a camera. The coil can be part of the camera circuit. With an absence of the camera-control signal, the first port is used and the multi-turn coil functions as an NFC antenna associated with the NFC matching circuit. In an example of an embodiment, a method for controlling a multi-turn-coil multiplex circuit may be performed by at least some of the aforementioned electrical components. Also, in an example, a mobile device may include at least some of the aforementioned components.

Also, in an example, a device (such as at least a part of the mobile device) may include components for controlling a multi-turn-coil multiplex circuit. The device may include the multi-turn-coil multiplex circuit. The multi-turn-coil multiplex circuit may include a multi-turn coil, a switch, a NFC matching circuit, and a camera circuit. The switch may include a common port, a first port, and a second port. The multi-turn coil can be connected to the common port, the NFC matching circuit can be connected to the first port, and the camera circuit can be connected to the second port. The device can further include a processor and a memory for storing instructions executable by the processor. The processor can be configured to, in accordance with the instructions: in a presence of a camera-control signal, use the second port and the multi-turn coil to function as a focus-adjusting coil for a camera associated with the camera circuit. The processor can also be configured to, in accordance with the instructions: in an absence of the camera-control signal, use the first port and the multi-turn coil to function as an NFC antenna associated with the NFC matching circuit.

In an example, a non-transitory computer readable storage medium may include instructions that can be applied to a mobile device for controlling the multi-turn-coil multiplex circuits described herein. The instructions, when executed by a processor (such as a processor of a mobile device), can control the multi-turn-coil multiplex circuit. This can include causing the mobile device to: in a presence of a camera-control signal, use the second port and the multi-turn coil as a focus-adjusting coil for a camera associated with the camera circuit; and in an absence of the camera-control signal, use the first port and the multi-turn coil as an NFC antenna associated with the NFC matching circuit.

This summary and the following detailed descriptions are merely exemplary and do not limit the present disclosure.

BRIEF DESCRIPTION OF THE DRAWINGS

Non-limiting and non-exhaustive examples are described with reference to the following figures. The components in the drawings are not necessarily to scale, and like referenced numerals designate corresponding parts throughout the different views.

FIG. 3 is a flow chart of an example method for controlling a multi-turn-coil multiplex circuit (such as the circuit illustrated in FIG. 1 or FIG. 2).

FIG. 4 is a flow chart of an example method for controlling a multi-turn-coil multiplex circuit according to another embodiment.

DETAILED DESCRIPTION

Subject matter described herein is intended to be construed as not being limited to examples set forth herein; examples are provided merely to be illustrative. The following detailed description is not intended to be limiting on the scope of what is claimed.

The multi-turn-coil multiplex circuits described herein may be configured to implement both a focus adjusting function for a camera and an NFC antenna function.

Electronic devices (such as smart phones and tablet computers) can be integrated with NFC antennas and cameras. When a user takes pictures or videos with a camera on a device, the camera may adjust a focal length according to a distance between a scene to be photographed and the camera. A focusing lens of the camera may be moved so that its imaging focus may operate with a light sensor of the camera. A process of adjusting a focal length of the camera can be performed by changing a magnitude of a current on a focus-adjusting coil of the camera. This change in magnitude of the current can adjust a magnitude of a magnetic field produced by the coil, so as to change an interaction force between an electromagnet (including the focus-adjusting coil) and a permanent magnet integrated with the camera. These changes can be used to change a distance between a focusing lens of the camera and a light sensor, so as to adjust a focal length.

An NFC antenna can be an annular antenna, including a length of a quarter of an electromagnetic wavelength of an NFC operating frequency. If a focus-adjusting coil of a camera has a length similar to the length of a quarter of an electromagnetic wavelength of an NFC operating frequency, the focus-adjusting coil may also operate as an NFC antenna. A resonant frequency of the NFC antenna can be determined by a length of the NFC antenna, and the resonant frequency of the NFC antenna may be adjusted by a tuning circuit. Variations in the length of the coil within a predetermined range are acceptable. The variance of the length of the coil may differ within a predetermined range of 0-10 millimeters.

Figure 1:
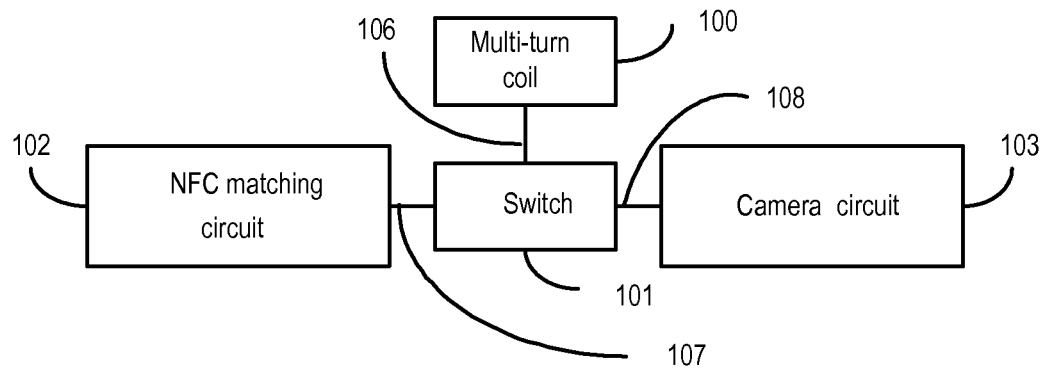
FIG. 1 is a block diagram of an example embodiment of a multi-turn-coil multiplex circuit.

FIG. 1 is a block diagram of an example embodiment of a multi-turn-coil multiplex circuit. The multi-turn-coil multiplex circuit may include a multi-turn coil 100, a switch 101, an NFC matching circuit 102, and a camera circuit 103, such as a camera circuit card. The switch 101 may include a common port 106, a first port 107, and a second port 108. The multi-turn coil 100 may be connected to the common port 106. The NFC matching circuit 102 may be connected to the first port 107. The camera circuit 103 may be connected to the second port 108.

In a presence of a camera-control signal, the second port can be used to communicate the signal such that the multi-turn coil 100 is configured to function as a focus-adjusting coil for a camera associated with the camera circuit 103. While in an absence of a camera-control signal, the first port can be used to communicate a radio frequency (RF) signal (such as an NFC RF signal) such that the multi-turn coil is configured to function as an NFC antenna associated with NFC matching circuit 102.

In an example, the switch 101 may be one or more double-pole double-throw (DPDT) switches, single-pole double-throw (SPDT) switches, double-pole single-throw (DPST) switches, single-pole single-throw (SPST) switches, single pole changeover (SPCO) switches, or double pole changeover (DPCO) switches.

The multi-turn coil 100 can be connected to the common port of the switch 101 (e.g., a common port of a DPDT switch or a common port of a DPCO switch). The NFC matching circuit 102 can be connected to the first port of the switch 101. The camera circuit 103 is connected to the second port of the switch 101. Where the camera is not operational (e.g., there is no camera-control signal or when the camera-control signal is not sensed), blades of the switch 101 may be connected to the first port, to connect the multi-turn coil 100 with the NFC matching circuit 102 such that the multi-turn coil functions as an NFC antenna. When the camera is operational (e.g., there is a camera-control signal or when the camera-control signal is sensed), the blades of the switch 101 may be connected to the second port, to connect the multi-turn coil 100 with the camera circuit 103 such that the multi-turn coil functions as a focus-adjusting coil of a corresponding camera (such as for adjusting focal length). Where the camera's operations cease (such as the adjusting of the focal length ceases, the camera-control signal ceases, or the camera-control signal is not sensed), the blades of the switch 101 re-connects to the first port to connect the multi-turn coil 100 with the NFC matching circuit 102.

In an example including such circuitry, an electronic device may have one coil that operates as a NFC antenna and a focus-adjusting coil. Also, in an example, the multi-turn coil may be included on a motherboard, such as a motherboard of a mobile phone or a personal computer (such as a tablet computer). The motherboard may be a motherboard of a device integrated with NFC circuitry and a camera. The multi-turn coil may be integrated on the motherboard. The multi-turn coil may or may not be attached to a battery cover or a battery of the electronic device.

In an example, the multi-turn coil may have a length being a quarter of an electromagnetic wavelength of an NFC operating frequency. In a free space, a propagation speed of an electromagnetic wave is near the speed of light, that is, the velocity of the electromagnetic wave is approximately $3*10^8$ m/s; and the wavelength of the electromagnetic wave is the velocity of the electromagnetic wave divided by its frequency, that is, the wavelength is $3*10^8/(13.56*10^6)$ =22.1 m. In a free space, a length of the NFC antenna may be 22.1/4=5.525 m. In an example, the multi-turn coil may be made of material having a high dielectric constant, so as to reduce its length. Also, the resonant frequency of the coil may be adjusted to an NFC operating frequency by a tuning circuit.

When acting as a NFC antenna, a main factor affecting the multi-turn coil's performance is the length of the NFC antenna. Also, other factors affecting its performance can be considered and adjusted, such as a current over the coil and a number of turns in the coil. Also, performance of the NFC antenna may be adjusted by the tuning circuit. In an example, length of the multi-turn coil may be selected based on requirements on the performance of the NFC antenna, and parameters such as the number of turns and the thickness of the multi-turn coil may be determined based on other restrictions, such as requirements of the focus-adjusting coil.

Figure 2:
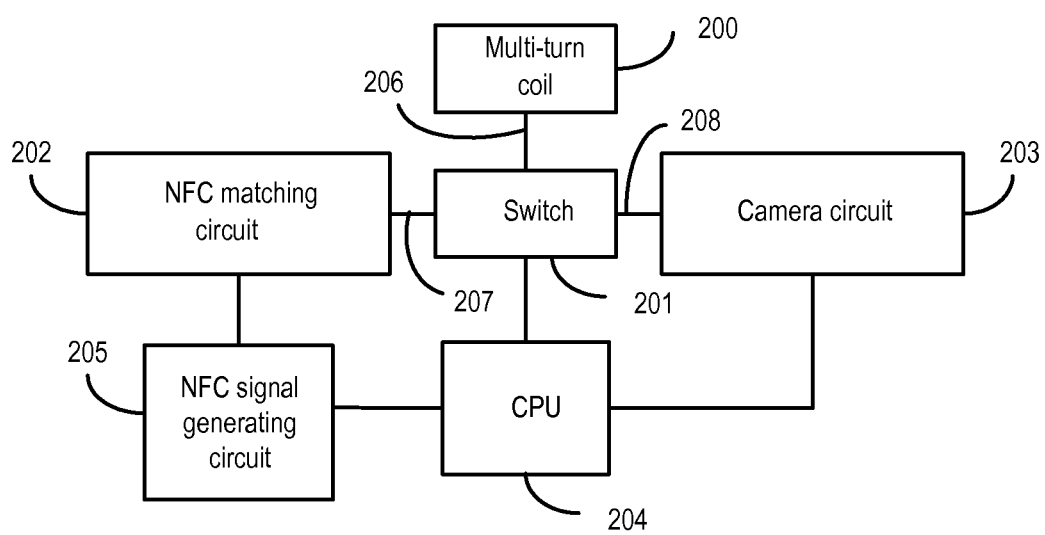
FIG. 2 is a block diagram of another example embodiment of a multi-turn-coil multiplex circuit.

FIG. 2 is a block diagram of another example embodiment of a multi-turn-coil multiplex circuit. The multi-turn-coil multiplex circuit may include a multi-turn coil 200, a switch 201, an NFC matching circuit 202, and a camera circuit 203, such as a camera circuit card. The multi-turn-coil multiplex circuit in FIG. 2 also includes a CPU 204 and an NFC signal generating circuit 205. The switch 201 includes a common port 206, a first port 207, and a second port 208. The multi-turn coil 200 may be connected to the common port 206. The NFC matching circuit 202 may be connected to the first port 207. The camera circuit 203 may be connected to the second port 208. The CPU 204 may be connected to the NFC signal generating circuit 205 and the camera circuit 203. The NFC signal generating circuit 205 may be connected to the NFC matching circuit 202.

The CPU 204 may be configured to communicate an NFC control signal, a camera-control signal, and a switch-control signal. The switch-control signal may be communicated over the first and the second port as a first-port-conducting signal and a second-port-conducting signal, respectively.

The NFC signal generating circuit 205 may be configured to generate an NFC signal according to the NFC control signal. When a triggering event associated with activating the camera is sensed (such as by the CPU 204 or a circuit communicatively coupled to the CPU), the CPU communicates the camera-control signal and the second-port-conducting signal to control the switch 201 to be switched to the second port. Where the signal is conducted via the second port, the camera circuit 203 may adjust a current on the multi-turn coil 200 according to the camera-control signal communicated from the CPU 204. When a triggering event associated with deactivating the camera is sensed (such as by the CPU 204 or a circuit communicatively coupled to the CPU), the CPU communicates the first-port-conducting signal while ceasing communication of the camera-control signal to control the switch to be switched to the first port. Where the signal is conducted via the first port, the NFC matching circuit 202 may adjust resonance of the multi-turn coil 200 according to the NFC signal output from the NFC signal generating circuit 205.

In an example, a default state of the switch may include maintaining the communication path between the NFC matching circuit 202 and the multi-turn coil 200. In this state, for example, the multi-turn coil can function as the NFC antenna. While in the default state, the camera-control signal may be generated by the camera circuit 203 when a user of a corresponding electronic device takes pictures using the camera.

The triggering event for activating the camera may include an action such as the user selecting a camera icon on a user interface of the device to start the camera. This may trigger an instruction to activate the camera to be communicated to the CPU 204. Then the CPU can control the switch 201 to switch the multi-turn coil 200 to be connected to the camera circuit 203 and then function as a focus-adjusting coil. When the camera is activated, there may be a short response time period for the activation. During the time period, the switch to the focus-adjusting coil may be completed independent of other features of the electronic device.

The triggering event for deactivating the camera may include an action such as the user selecting an icon of another application or an exit camera icon on the user interface. This selection to deactivate the camera is communicated by the camera circuit 203 to the CPU 204. The CPU 204 can control the switch to reconnect the multi-turn coil with the NFC matching circuit 202.

Alternatively, the default state of the switch may include maintaining the communication path between the camera circuit 203 and the multi-turn coil 200. For example, an electronic device that uses the camera more than the NFC may maintain the communication path between the camera circuit 203 and the multi-turn coil 200 as a default setting. On the other hand, an electronic device that uses NFC more than the camera may maintain the communication path between the NFC matching circuit 202 and the multi-turn coil 200 as a default setting. Also, the default setting for the switch 201 may include maintaining a communication path between the multi-turn coil 200 and a circuit other than the NFC matching circuit 202 and the camera circuit 203, or not maintaining a communication path with the coil.

Also, similar to the circuitry illustrated in FIG. 1, the circuitry illustrated in FIG. 2 may be integrated on a motherboard. Also, the circuits illustrated in FIG. 2 may include similar features to corresponding circuits illustrated in FIG. 1.

FIG. 3 is a flow chart of an example method 300 for controlling a multi-turn-coil multiplex circuit (such as the circuit illustrated in FIG. 1 or FIG. 2). As mentioned herein, a multi-turn-coil multiplex circuit may include a multi-turn coil, a switch, an NFC matching circuit, and a camera circuit. The switch may include a common port, a first port, and a second port. The multi-turn coil may be connected to the common port. The NFC matching circuit may be connected to the first port. The camera circuit may be connected to the second port.

The method 300 includes, in a presence of a camera-control signal, the second port communicating with the multi-turn coil so that the coil is configured to function as a focus-adjusting coil for a camera associated with the camera circuit at 301. The method 300 also includes, in an absence of a camera-control signal, the first port communicating with the multi-turn coil so that the coil is configured to function as an NFC antenna associated with the NFC matching circuit at 302.

Also, as mentioned herein, the multi-turn-coil multiplex circuit may further include a CPU and an NFC signal generating circuit. The CPU may be connected to the NFC signal generating circuit and the camera circuit, and the NFC signal generating circuit may be connected to the NFC matching circuit. The CPU may be configured to communicate an NFC control signal, the camera-control signal, and a switch-control signal. The switch-control signal may include a first-port-conducting signal and a second-port-conducting signal, as mentioned herein.

In an example, referring to FIG. 4, the operation at 301 may further include, when a triggering event for activating the camera is sensed, the camera-control signal and the second-port-conducting signal being communicated so that the switch is configured to be switched to the second port according to the second-port-conducting signal at 3011. The operation at 301 may also include the camera-control signal being communicated to the camera circuit via the second port at 3012. The camera circuit is then configured to adjust a current on the multi-turn coil according to the camera-control signal.

In an example, referring to FIG. 4, the operation at 302 may further include, when a triggering event for deactivating the camera is sensed, the first-port-conducting signal being communicated while the camera-control signal is ceased so that the switch is configured to be switched to the first port according to the first-port-conducting signal at 3021. The operation at 302 may also include the NFC control signal being communicated to the NFC signal generating circuit to generate an NFC signal, via the first port, at 3022. The NFC signal generating circuit is then configured to generate an NFC signal according to the NFC control signal. The NFC signal is communicated to the NFC matching circuit, via the first port, at 3023. The NFC matching circuit is configured to adjust resonance of the multi-turn coil according to the NFC signal.

In the present specification, the embodiments are described in a progressive way, so each embodiment is focused on the difference from other embodiments, thus the similar details may be referred to one another among the embodiments.

It should be understood by those skilled in the art that, the embodiments of the present disclosure may be provided as methods, devices, or computer program products. Therefore, the embodiments of the present disclosure may take forms of embodiments of mere hardware, mere software, or a combination of software and hardware. Furthermore, the present disclosure may take forms of computer program products executed on one or more computer usable storage media (e.g., disk storage, CD-ROM, and optical storage) containing computer usable program codes.

The present disclosure is described with reference to the flowchart and/or a block diagram of the method, the mobile device, and a computer program product according to the embodiments of the present disclosure. It should be understood that each process and/or block in the flowcharts and/or block diagrams, and combinations of processes and/or blocks in the flowcharts and/or block diagrams, may be realized by computer program instructions. These computer program instructions may be supplied to a generate-purpose computer, a special-purpose computer, an embedded processor, or processors of other programmable data processing devices, to create a machine, such that a device for realizing functions designated in one or more processes in the flowcharts and/or in one or more blocks in the block diagrams, may be produced by instructions performed by a computer or processors of other programmable data processing devices. The computer program instructions may also be stored in a computer readable storage that can boot a computer or other programmable data processing devices to operate in a specific way, such that a manufactured articles including an instruction device may be produced by the instructions stored in said computer readable storage, and said instruction device realizes the functions designated in one or more processes in the flowcharts and/or in one or more blocks in the block diagrams. The computer program instructions may further be loaded into a computer or other programmable data processing devices, such that a series of operating steps may be performed on the computer or other programmable data processing devices, so as to generate processes realized by the computer, such that steps for realizing the functions designated in one or more processes in the flowcharts and/or in one or more blocks in the block diagrams may be provided by the instructions executed on the computer or other programmable data processing devices.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only with a true scope and spirit of the invention being indicated by the appended claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

The invention claimed is:

1. A multi-turn-coil multiplex circuit, comprising:
   a switch that includes a common port, a first port, and a second port;
   a near field communication (NFC) matching circuit connected to the first port;
   a camera circuit connected to the second port;
   a multi-turn coil connected to the common port; and
   wherein:
   the second port is configured to activate in response to a presence of a camera-control signal so that the multi-turn coil functions as a focus-adjusting coil of a camera associated with the camera circuit, wherein a communication path between the camera circuit and the multi-turn coil is maintained as a default state when the camera is used more than the NFC matching circuit,
   the first port is configured to activate in response to an absence of the camera-control signal so that the multi-turn coil functions as an NFC antenna associated with the NFC matching circuit, and
   the multi-turn coil functions as the focus-adjusting coil for the camera when the second port is used, and the multi-turn coil functions as the NFC antenna associated with the NFC matching circuit when the first port is used.

2. The multi-turn-coil multiplex circuit according to claim 1, wherein the multi-turn-coil multiplex circuit further includes:
   a central processing unit (CPU), the CPU configured to:
   communicate a switch control signal, the switch control signal including a first-port-conducting signal or a second-port-conducting signal;
   communicate a camera-control signal and the second-port-conducting signal to control the switch to be switched to the second port, where a triggering event for activating the camera is sensed;
   control the camera circuit to adjust a current on the multi-turn coil according to the camera-control signal, where the switch is switched to the second port by the second-port-conducting signal; and communicate the first-port-conducting signal while ceasing communication of the camera-control signal, to control the switch to be switched to the first port, where a triggering event for deactivating the camera is sensed;
   an NFC signal generating circuit, the NFC signal generating circuit configured to:
   generate an NFC signal according to an NFC control signal communicated from the CPU; and
   communicate the NFC signal to the NFC matching circuit; and
   the NFC matching circuit configured to adjust a resonance of the multi-turn coil according to the NFC signal communicated from the NFC signal generating circuit, where the switch is switched to the first port by the first-port-conducting signal.

3. The multi-turn-coil multiplex circuit according to claim 2, wherein the CPU is connected to the NFC signal generating circuit and the camera circuit, and wherein the NFC signal generating circuit is connected to the NFC matching circuit.

4. The multi-turn-coil multiplex circuit according to claim 2, wherein the multi-turn coil is included on a motherboard.

5. The multi-turn-coil multiplex circuit according to claim 2, wherein the multi-turn coil includes a length that is a quarter of an electromagnetic wavelength of an NFC operating frequency.

6. The multi-turn-coil multiplex circuit according to claim 1, wherein the multi-turn coil is included on a motherboard.

7. The multi-turn-coil multiplex circuit according to claim 1, wherein the multi-turn coil includes a length that is a quarter of an electromagnetic wavelength of an NFC operating frequency.

8. A method, comprising:
communicating, by a central processing unit (CPU), a switch control signal to a switch, the switch control signal including a first-port-conducting signal or a second-port-conducting signal;
in an absence of a camera-control signal, activating, with the first-port-conducting signal, a first port of the switch so that a multi-turn coil connected to the switch functions as a near field communication (NFC) antenna;
controlling, by an NFC control signal, an NFC circuit to generate an NFC signal and communicate the NFC signal to an NFC matching circuit associated with the NFC antenna;
controlling, by the NFC signal, the NFC matching circuit to adjust a resonance of the multi-turn coil, where the switch is switched to the first port;
communicating the camera-control signal and the second-port-conducting signal to control the switch to be switched to a second port of the switch, where a triggering event for activating the camera is sensed, wherein a communication path between the camera and the multi-turn coil is maintained as a default state when the camera is used more than the NFC matching circuit;
in a presence of the camera-control signal, activating, with the second-port-conducting signal, the second port so that the multi-turn coil functions as a focus-adjusting coil for a camera; and
controlling, by the camera-control signal, a camera circuit associated with the camera to adjust a current on the multi-turn coil, where the switch is switched to the second port, wherein the multi-turn coil functions as the focus-adjusting coil for the camera when the second port is used, and the multi-turn coil functions as the NFC antenna associated with the NFC matching circuit when the first port is used.

9. The method according to claim 8, further comprising communicating the first-port-conducting signal while ceasing communication of the camera-control signal, to control the switch to be switched back to the first port, where a second triggering event for deactivating the camera is sensed.

10. The method according to claim 9, wherein the multi-turn coil is included on a motherboard.

11. The method according to claim 9, wherein the multi-turn coil includes a length that is a quarter of an electromagnetic wavelength of an NFC operating frequency.

12. The method according to claim 8, wherein the multi-turn coil is included on a motherboard.

13. The method according to claim 8, wherein the multi-turn coil includes a length that is a quarter of an electromagnetic wavelength of an NFC operating frequency.

14. A mobile device, comprising:
a switch that includes a common port, a first port, and a second port;
a near field communication (NFC) matching circuit connected to the first port;
a camera circuit connected to the second port; and
a multi-turn coil connected to the common port; and
wherein:
the second port is configured to activate in response to a presence of a camera-control signal so that the multi-turn coil functions as a focus-adjusting coil of a camera associated with the camera circuit, wherein a communication path between the camera circuit and the multi-turn coil is maintained as a default state when the camera is used more than the NFC matching circuit,
the first port is configured to activate in response to an absence of the camera-control signal so that the multi-turn coil functions as an NFC antenna associated with the NFC matching circuit, and
the multi-turn coil functions as the focus-adjusting coil for the camera when the second port is used, and the multi-turn coil functions as the NFC antenna associated with the NFC matching circuit when the first port is used.

15. The mobile device according to claim 14, wherein the mobile device further comprises:
a central processing unit (CPU), the CPU configured to:
communicate a switch control signal, the switch control signal including a first-port-conducting signal or a second-port-conducting signal;
communicate a camera-control signal and the second-port-conducting signal to control the switch to be switched to the second port, where a triggering event for activating the camera is sensed;
control the camera circuit to adjust a current on the multi-turn coil according to the camera-control signal, where the switch is switched to the second port by the second-port-conducting signal; and
communicate the first-port-conducting signal while ceasing communication of the camera-control signal, to control the switch to be switched to the first port, where a triggering event for deactivating the camera is sensed;
an NFC signal generating circuit, the NFC signal generating circuit configured to:
generate an NFC signal according to an NFC control signal communicated from the CPU; and
communicate the NFC signal to the NFC matching circuit; and
the NFC matching circuit configured to adjust a resonance of the multi-turn coil according to the NFC signal communicated from the NFC signal generating circuit, where the switch is switched to the first port by the first-port-conducting signal.

16. The mobile device according to claim 15, wherein the CPU is connected to the NFC signal generating circuit and the camera circuit, and wherein the NFC signal generating circuit is connected to the NFC matching circuit.

17. The mobile device according to claim 15, wherein the multi-turn coil is included on a motherboard.

18. The mobile device according to claim 15, wherein the multi-turn coil includes a length that is a quarter of an electromagnetic wavelength of an NFC operating frequency.

19. The mobile device according to claim 14, wherein the multi-turn coil is included on a motherboard.

20. The mobile device according to claim 14, wherein the multi-turn coil includes a length that is a quarter of an electromagnetic wavelength of an NFC operating frequency.

* * * * *